United States Patent
Burrell et al.

(10) Patent No.: US 9,772,869 B2
(45) Date of Patent: Sep. 26, 2017

(54) SYSTEM AND METHOD FOR PERFORMING EFFICIENT FAILOVER AND VIRTUAL MACHINE (VM) MIGRATION IN VIRTUAL DESKTOP INFRASTRUCTURE (VDI)

(71) Applicant: AMERICAN MEGATRENDS, INC., Norcross, GA (US)

(72) Inventors: Brandon Burrell, Suwanee, GA (US); Muthukkumaran Ramalingam, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 308 days.

(21) Appl. No.: 14/606,798

(22) Filed: Jan. 27, 2015

(65) Prior Publication Data

US 2016/0216987 A1    Jul. 28, 2016

(51) Int. Cl.
*G06F 9/455* (2006.01)
*G06F 9/46* (2006.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2006/0155912 A1* | 7/2006 | Singh | G06F 9/5088 711/6 |
| 2011/0142053 A1* | 6/2011 | Van Der Merwe | H04L 47/72 370/395.1 |
| 2013/0311824 A1* | 11/2013 | Ji | G06F 11/1438 714/15 |
| 2014/0143496 A1* | 5/2014 | Bert | G06F 12/0871 711/130 |
| 2015/0106805 A1* | 4/2015 | Melander | G06F 9/45537 718/1 |
| 2015/0120928 A1* | 4/2015 | Gummaraju | H04L 67/1008 709/226 |
| 2016/0098297 A1* | 4/2016 | Yuyitung | G06F 11/3442 718/104 |
| 2016/0103698 A1* | 4/2016 | Yang | G06F 11/202 714/4.11 |
| 2016/0246625 A1* | 8/2016 | Katsura | G06F 12/00 |

* cited by examiner

*Primary Examiner* — Bradley Teets
(74) *Attorney, Agent, or Firm* — Locke Lord LLP; Tim Tingkang Xia, Esq.

(57) ABSTRACT

Certain aspects direct to systems and methods for performing virtual machine (VM) management to provide efficient user login and minimize resource usage. The system includes a virtual machine server storing a hypervisor and multiple VMs, and a virtual desktop controller. The virtual desktop controller is configured to control the virtual machine server to execute the hypervisor, and to execute at least (M+S) instances of the VMs on the executed hypervisor. When the virtual desktop controller detects a current number X of the executed VMs on the executed hypervisor, the virtual desktop controller determines whether X is greater than M. If X is greater than M, the virtual desktop controller controls the virtual machine server to execute some instances unexecuted VMs as the spare VMs on the hypervisor, such that S instances of the spare VMs are available to provide efficient user login.

14 Claims, 4 Drawing Sheets

SYSTEM AND METHOD FOR PERFORMING EFFICIENT FAILOVER AND VIRTUAL MACHINE (VM) MIGRATION IN VIRTUAL DESKTOP INFRASTRUCTURE (VDI)

FIELD

The present disclosure relates generally to virtual desktop infrastructure (VDI) technology, and more particularly to systems and methods for performing virtual machine management to provide efficient user login while minimizing resource usage.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Virtual desktop infrastructure (VDI) is a desktop-centric service that hosts user desktop environments on remote servers or personal computers, which are accessed over a network using a remote display protocol. Typically, a system applying VDI technology may include multiple computing devices and servers to perform different VDI related functions. One of these functions is to host multiple desktop operating system instances on one or more virtual machine hardware platform running a hypervisor. Such virtual machine hardware platform is generally referred to as a virtual machine server. In this case, application execution takes place on a virtual desktop of a virtual machine (VM), which is linked to the local client device over a network or a cloud using a remote display protocol through which the user interacts with applications. Generally, a virtual machine instance may be pre-started before the corresponding user at the thin client computing device requests to start the VM instance such that the user login process may be efficient. However, the resource usage of the virtual machine instances executed on the virtual machine server may present potential wasteful consumption of energy and/or computer resources.

Therefore, an unaddressed need exists in the art to address the aforementioned deficiencies and inadequacies.

SUMMARY

Certain aspects of the disclosure direct to a system, which includes a virtual machine server and a virtual desktop controller communicatively connected to the virtual machine server via an interface. The virtual machine server stores a hypervisor and a plurality of virtual machines (VMs) {VM-1, VM-2, ..., VM-N}, where N is a positive integer. The virtual desktop controller includes a processor, a memory, and a storage device storing computer executable code. The computer executable code, when executed at the processor, is configured to: control the virtual machine server to execute the hypervisor, and to execute at least (M+S) instances of the VMs as spare VMs on the executed hypervisor, where M and S are integers, $0 \leq M < N$, and $0 < S < N$; detect a current number X of the executed VMs on the executed hypervisor, where X is an integer, and $0 \leq X \leq N$; determine whether the current number X is greater than M; and in response to determining that X is greater than M, control the virtual machine server to execute a plurality of unexecuted VMs as the spare VMs on the executed hypervisor, such that at least S instances of the spare VMs are available.

In certain embodiments, the computer executable code, when executed at the processor, is further configured to: when S is greater than (N−X), control the virtual machine server to execute all of the unexecuted VMs as the spare VMs on the hypervisor.

In certain embodiments, the system further includes a plurality of computing devices communicatively connected to the virtual machine server via a network, wherein each of the computing devices is configured to remotely access one of the executed VMs. In certain embodiments, the virtual machine server is configured to execute the hypervisor, and execute the VMs on the executed hypervisor, where each of the executed VMs is configured to be accessible for the computing devices functioning as a plurality of thin clients.

In certain embodiments, the virtual machine server of the system is configured to: receive a first instruction from a first computing device of the computing devices to access one of the VMs, where the first computing device is not remotely accessing any of the executed VMs; and assign one of the spare VMs to the first computing device in response to the first instruction.

In certain embodiments, the virtual machine server of the system is further configured to: receive a second instruction from a second computing device of the computing devices to shut down a corresponding executed VM assigned to the second computing device, wherein the second computing device is remotely accessing the corresponding executed VM; and shut down the corresponding executed VM in response to the second instruction.

In certain embodiments, the computer executable code is configured to detect the current number X of the executed VMs periodically.

In certain embodiments, each of the VMs is a shared instance of a pooled VM.

Certain aspects of the disclosure direct to a method for performing virtual machine (VM) management to provide efficient user login and minimize resource usage, the method comprising. In certain embodiments, the method includes: controlling, by a virtual desktop controller, a virtual machine server to execute a hypervisor, and to execute at least (M+S) instances of a plurality of VMs {VM-1, VM-2, ..., VM-N} as spare VMs on the executed hypervisor, where the virtual desktop controller is communicatively connected to the virtual machine server via an interface, N is a positive integer, and M and S are integers, wherein $0 \leq M < N$, and $0 < S < N$; detecting, by the virtual desktop controller, a current number X of the executed VMs on the executed hypervisor, wherein X is an integer, and $0 \leq X \leq N$; determining, by the virtual desktop controller, whether the current number X is greater than M; and in response to determining that X is greater than M, controlling, by the virtual desktop controller, the virtual machine server to execute a plurality of unexecuted VMs as the spare VMs on the executed hypervisor, such that at least S instances of the spare VMs are available.

In certain embodiments, the method further includes: when S is greater than (N−X), controlling, by the virtual desktop controller, the virtual machine server to execute all of the unexecuted VMs as the spare VMs on the hypervisor.

In certain embodiments, a plurality of computing devices is communicatively connected to the virtual machine server via a network, where each of the computing devices is configured to remotely access one of the executed VMs.

In certain embodiments, the virtual machine server is configured to: receive a first instruction from a first computing device of the computing devices to access one of the VMs, where the first computing device is not remotely accessing any of the executed VMs; and assign one of the spare VMs to the first computing device in response to the first instruction.

In certain embodiments, the virtual machine server is further configured to: receive a second instruction from a second computing device of the computing devices to shut down a corresponding executed VM assigned to the second computing device, wherein the second computing device is remotely accessing the corresponding executed VM; and shut down the corresponding executed VM in response to the second instruction.

In certain embodiments, each of the VMs is a shared instance of a pooled VM.

Certain aspects of the disclosure direct to a non-transitory computer readable medium storing computer executable code. In certain embodiments, the code, when executed at a processor of a virtual desktop controller, is configured to: control a virtual machine server to execute a hypervisor, and to execute at least (M+S) instances of a plurality of VMs {VM-1, VM-2, ..., VM-N} as spare VMs on the executed hypervisor, wherein the virtual desktop controller is communicatively connected to the virtual machine server via an interface, N is a positive integer, and M and S are integers, wherein $0 \leq M < N$, and $0 < S < N$; detect a current number X of the executed VMs on the executed hypervisor, wherein X is an integer, and $0 \leq X \leq N$; determine whether the current number X is greater than M; and in response to determining that X is greater than M, control the virtual machine server to execute a plurality of unexecuted VMs as the spare VMs on the executed hypervisor, such that at least S instances of the spare VMs are available.

In certain embodiments, the computer executable code, when executed at the processor, is further configured to: when S is greater than (N−X), control the virtual machine server to execute all of the unexecuted VMs as the spare VMs on the hypervisor.

In certain embodiments, a plurality of computing devices is communicatively connected to the virtual machine server via a network, where each of the computing devices is configured to remotely access one of the executed VMs.

In certain embodiments, the virtual machine server is configured to: receive a first instruction from a first computing device of the computing devices to access one of the VMs, where the first computing device is not remotely accessing any of the executed VMs; and assign one of the spare VMs to the first computing device in response to the first instruction.

In certain embodiments, the virtual machine server is further configured to: receive a second instruction from a second computing device of the computing devices to shut down a corresponding executed VM assigned to the second computing device, wherein the second computing device is remotely accessing the corresponding executed VM; and shut down the corresponding executed VM in response to the second instruction.

In certain embodiments, each of the VMs is a shared instance of a pooled VM.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
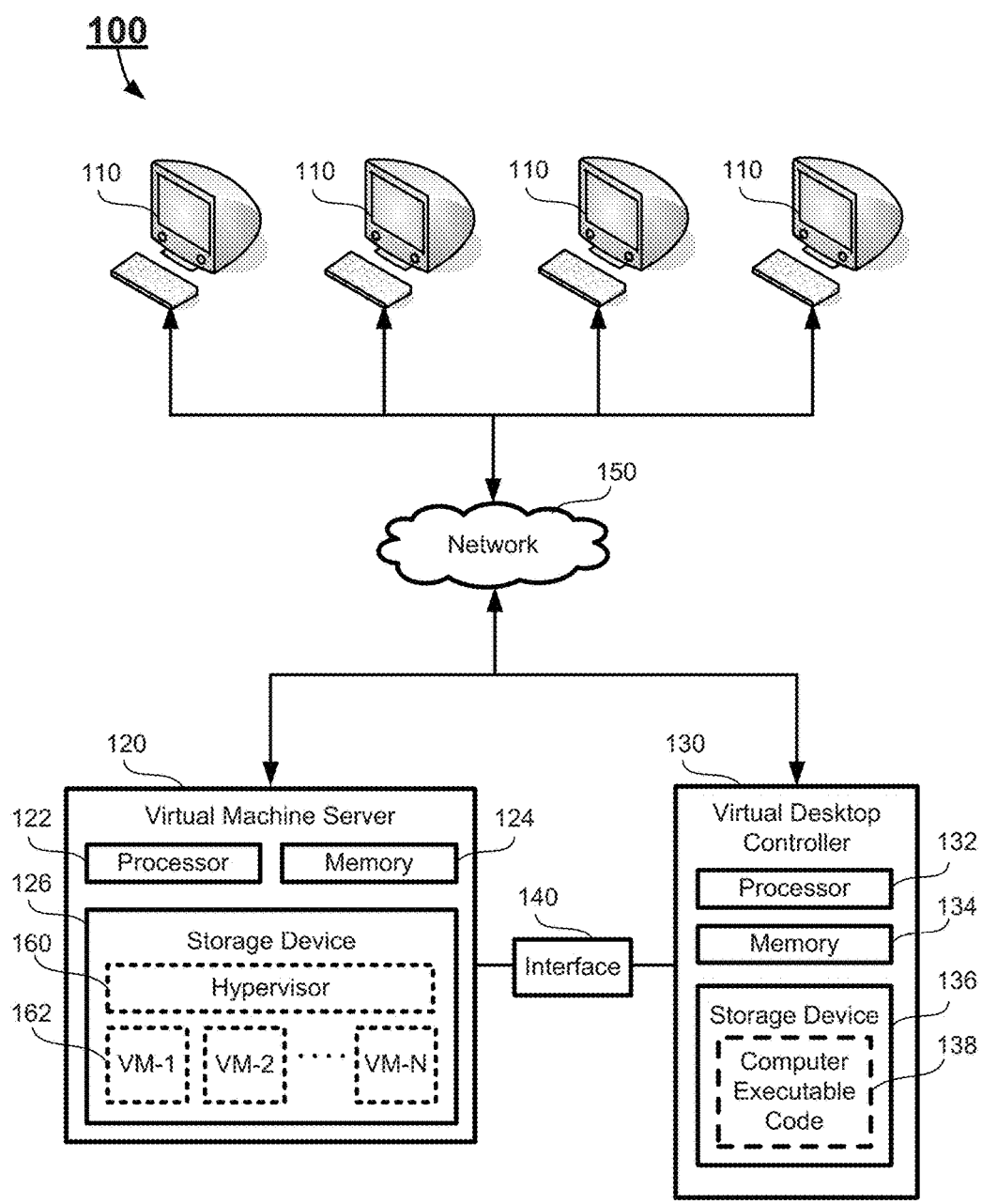
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

One aspect of the present disclosure is directed to a system for performing virtual machine management to provide efficient user login and minimize resource usage. FIG. 1 schematically depicts a VDI system according to certain embodiments of the present disclosure. The system 100 is capable of performing VM management to provide efficient user login and minimize resource usage. As shown in FIG. 1, the system 100 includes a plurality of computing devices 110, a virtual machine server 120, and a virtual desktop controller 130. The virtual machine server 120 is communicatively connected to the virtual desktop controller 120 via an interface 140. The virtual machine server 120 and the virtual desktop controller 130 are communicatively connected to the computing devices 110 via a network 150. The network 150 may be a wired or wireless network, and may be of various forms, such as a public network and a private network. Examples of the network 150 may include, but not limited to, a local area network (LAN) or wide area network (WAN) including the Internet. In certain embodiments, two or more different networks 150 may be applied to connect the computing devices 110, the virtual machine server 120, and the virtual desktop controller 130.

Each of the computing devices 110 may be a general purpose computer server system or a headless server. Examples of the computing devices 110 may include, but not limited to, a server, a thin client computing device, or any other server or computing device for the system 100. Each of the computing devices 110 may include necessary hardware and software components to perform certain predetermined tasks. For example, each of the computing devices 110 may include a processor, a memory, a storage, at least one network interface card (NIC), and other hardware components and software components (not shown) to perform its corresponding tasks. Examples of these hardware and software components may include, but not limited to, other required memory, interfaces, buses, Input/Output (I/O) modules and peripheral devices.

The virtual machine server 120 is a computing device which serves as a server for providing VM services for the system 100. In certain embodiments, the virtual machine servers 120 may include necessary hardware and software components to perform certain predetermined tasks. For example, as shown in FIG. 1, the virtual machine server 120 includes a processor 122, a memory 124, and a storage device 126. Further, the virtual machine server 120 may include other hardware components and software components (not shown) to perform its corresponding tasks. Examples of these hardware and software components may include, but not limited to, other required memory, interfaces, buses, Input/Output (I/O) modules, NICs and peripheral devices.

The processor 122 is configured to control operation of the virtual machine server 120. In certain embodiments, the processor 122 may be a central processing unit (CPU). The processor 122 can execute any computer executable code or instructions, such as the hypervisor 160, an operating system (OS), or other applications of the virtual machine server 120. In certain embodiments, the virtual machine server 120 may run on more than one processor, such as two processors, four processors, eight processors, or any suitable number of processors.

The memory 124 can be a volatile memory, such as the random-access memory (RAM), for storing the data and information during the operation of the virtual machine server 120. In certain embodiments, the memory 124 may be a volatile memory array.

The storage device 126 is a non-volatile data storage media for storing the applications of the virtual machine server 120. Examples of the storage device 126 may include flash memory, memory cards, USB drives, hard drives, floppy disks, optical drives, or any other types of data storage devices.

As shown in FIG. 1, the storage device 126 of the virtual machine server 120 stores a hypervisor 160, and a plurality of VMs 162. Specifically, the number of the VMs 162 is N, and each of the VMs 162 is labeled as {VM-1, VM-2, . . . , VM-N}, where N is a positive integer. In certain embodiments, the storage device 126 of the virtual machine server 120 may store other applications necessary for the operation of the virtual machine server 120.

In certain embodiments, each of the VMs 162 may be a shared instance of a pooled VM. A pooled VM is a master VM, which may generate multiple shared copies or instances to be shared by a group of users, such that any one of the users in the group may access an instance of the pooled VM. In comparison, if a VM is only assignable to a specific user and not shared by anyone else, the VM is a personalized VM.

The hypervisor 160 is a program that allows multiple VM instances to run simultaneously and share a single hardware host, such as the virtual machine server 120. The hypervisor 160, when executed at the processor 122 of the virtual machine server 120 or any other processor, implements hardware virtualization techniques and allows one or more operating systems or other applications to run concurrently as guests of one or more virtual machines on the host server (i.e., the virtual machine server 120). For example, a plurality of users, each from one of the thin clients (e.g., the computing device 110), may attempt to run operating systems in the system 100. The hypervisor 160 allows each user to run an operating system instance as a VM. In certain embodiments, the hypervisor 160 can be of various types and designs, such as MICROSOFT HYPER-V, XEN, VMWARE ESX, or other types of hypervisors suitable for the system 100.

Figure 2:
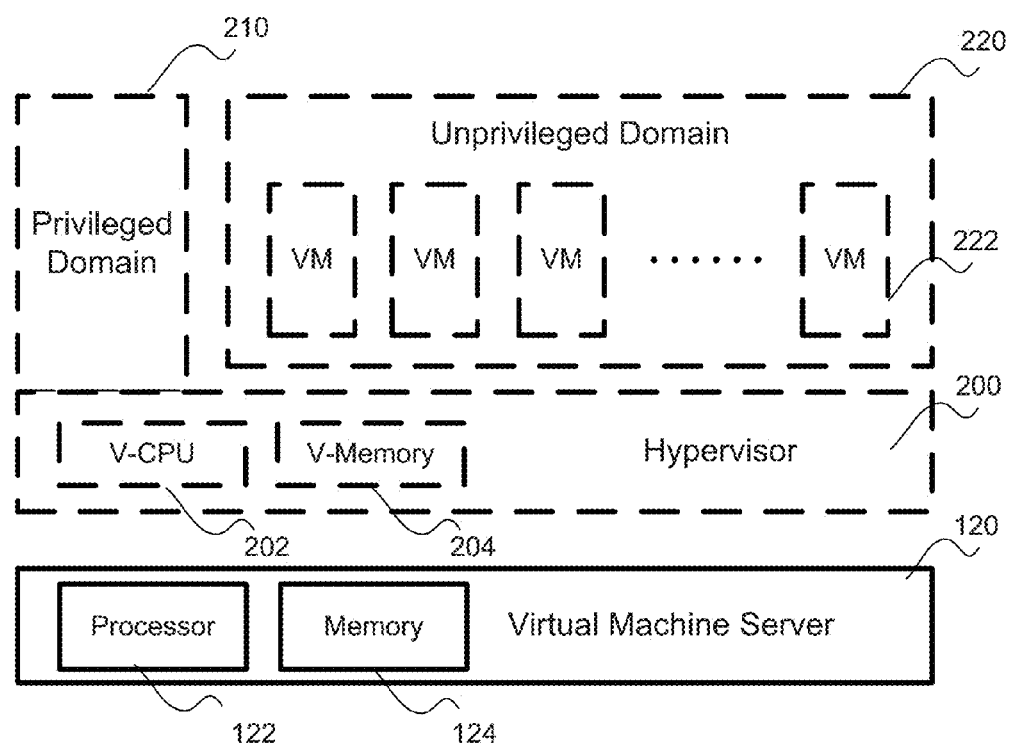
FIG. 2 schematically depicts the execution of the VMs on the system according to certain embodiments of the present disclosure.

FIG. 2 schematically depicts the execution of the VMs on the system according to certain embodiments of the present disclosure. As shown in FIG. 2, when the hypervisor instance 200 runs on the virtual machine server 120, the hypervisor 200 emulates a virtual computer machine, including a virtual CPU 202 and a virtual memory 204. The hypervisor 200 also emulates a plurality of domains, including a privileged domain 210 and an unprivileged domain 220 for the VM. A plurality of VM's 222 can run in the unprivileged domain 220 of the hypervisor 200 as if they are running directly on a physical computer.

In certain embodiments, the virtual machine server 120, under control by the virtual desktop controller 130, is configured to execute the hypervisor 160, and execute the VMs 162 on the executed hypervisor, where each of the executed VMs 162 is configured to be accessible for the computing devices 110 functioning as a plurality of thin clients.

In certain embodiments, when one of the computing devices 110 serves as the thin client computing device of the system, the operation of the thin client computing device depends heavily on the virtual machine server 120 of the system 100. In certain embodiments, a user may operate the computing device 110 to remotely access one of the executed VMs 162 at the virtual machine server 120. For example, a user may operate one of the computing devices 110 to remotely connect to the virtual machine server 120, and perform a login procedure to remotely access an executed VM 162 on the executed hypervisor 160 at the virtual machine server 120. By performing the login procedure, the computing device 110 may send a corresponding instruction to the virtual machine server 120, such that the virtual machine server 120 may execute a VM 162 and assign the executed to the computing device 110 for the remote access. On the other hand, when a user is remotely accessing an executed VM 162 on the executed hypervisor 160 at the virtual machine server 120, the user may perform a logout procedure to stop accessing the VM 162. By performing the logout procedure, the computing device 110 may send a corresponding instruction to the virtual machine server 120 to shut down the VM 162. In this case, execution of the executed VM 162 will be stopped in response to the instruction.

Referring back to FIG. 1, the virtual desktop controller 130 is a controller to control the configuration and validation of the components of the virtual machine server 120. In certain embodiments, the virtual desktop controller 130 may be implemented by a service processor (SP) or a baseboard management controller (BMC), which may be located in the virtual machine server 120. The SP or the BMC is a specialized microcontroller that manages the interface between system management software and platform hardware. Different types of sensors may be built into a host computer where the SP/BMC is located (e.g., the virtual machine server 120), and the SP/BMC may reads these sensors to obtain parameters such as temperature, cooling fan speeds, power status, operating system status, etc. The SP/BMC may be configured to monitor the sensors and may send out-of-band (OOB) alerts to a system administrator of the host computer if any of the parameters do not stay within preset limits, indicating a potential failure of the host computer. In certain embodiments, the administrator may also remotely communicate with the SP/BMC from any of the computing devices 110 via the network 150 to take remote action to the host computer. For example, when the SP/BMC is located in the virtual machine server 120, the administrator may reset the virtual machine server 120 from any of the computing device 110 through the SP/BMC, and may obtain system information of the virtual machine server 120 OOB without interrupting the operation of the virtual machine server 120.

It should be noted that the virtual desktop controller 130 is not necessary implemented by the SP/BMC as shown in FIG. 1. In certain embodiments, the virtual desktop controller 130 may be implemented in the virtual machine server 120 as a part of the virtual machine server 120. For example, the virtual desktop controller 130 may be implemented in the virtual machine server 120 and other servers of the system 100. In this case, the virtual desktop controller 130 may share the hardware and software components of the servers with other software components of the servers to perform certain predetermined tasks. In certain embodiments, the virtual desktop controller 130 may be implemented as a virtual machine within the virtual machine server 120 by one of the VMs 162. In certain embodiments, the virtual desktop controller 130 may be implemented by a separate computing device 110, which is independent from and not included in any of the servers or computing devices 110 of the system 100.

When the virtual desktop controller 130 is implemented as an independent SP/BMC, the virtual desktop controller 130 may include necessary hardware and software components to perform certain predetermined tasks. For example, as shown in FIG. 1, the virtual desktop controller 130 includes a processor 132, a memory 134 and a non-volatile memory 136. Further, the virtual desktop controller 130 may include other hardware components and software components (not shown) to perform its corresponding tasks. Examples of these hardware and software components may include, but not limited to, other required memory, interfaces, buses, I/O modules, NICs and peripheral devices.

The processor 132 is configured to control operation of the virtual desktop controller 130. In certain embodiments, the processor 132 may be a central processing unit (CPU). The processor 132 can execute any computer executable code or instructions, such as the firmware or other applications of the virtual desktop controller 130. In certain embodiments, the virtual desktop controller 130 may run on more than one processor, such as two processors, four processors, eight processors, or any suitable number of processors.

The memory 134 can be a volatile memory, such as the random-access memory (RAM), for storing the data and information during the operation of the virtual desktop controller 130.

The non-volatile memory 136 is a non-volatile data storage media for storing the computer executable code 138 of the virtual desktop controller 130. Examples of the non-volatile memory 136 may include flash memory, memory cards, USB drives, hard drives, floppy disks, optical drives, or any other types of non-volatile data storage devices.

The computer executable code 138 may serve as the firmware of the virtual desktop controller 130, and may be executed at the processor 132 of the virtual desktop controller 130 or any other processor. In certain embodiments, the computer executable code 138, when executed at the processor 132, is configured to control the virtual machine server 120 to execute the hypervisor 160, and to execute at least one of the VMs 162 on the executed hypervisor 160. Further, the computer executable code 138, when executed at the processor 132, is configured to monitor the operation of the virtual machine server 120, and to perform corresponding operations to control the virtual machine server 120 in order to provide efficient user login for the users of the system 100 and to minimize resource usage of the virtual machine server 120. In certain embodiments, the corresponding operations may include: detecting a number of the VMs 162 being currently executed on the executed hypervisor 160, and based on the detected number of the executed VMs 162, control the virtual machine server 120 to prepare a plurality of spare VMs on the executed hypervisor 160 in order to provide efficient user login for the users of the system 100.

The concept of providing spare VMs is to save time for efficient user login purposes. When a user attempts to remotely access a VM 162 at the virtual machine server 120 from a computing device 110, it is mandatory to execute the VM 162 such that the executed VM 162 may be assigned to the computing device 110. However, executing VMs on a hypervisor 160 at the virtual machine server 120 is resource intensive, which consumes memory, processor cycles, network bandwidth and storage space. Further, when a VM 162 is executed, the time to start the VM 162 generally depends on the number of VMs 162 executed on the hypervisor 160. When the hypervisor 160 has more executed VMs 162 running thereon, the startup time for a new VM instance will increase. In other words, the virtual machine server 120 will take more time to start a VM 162 if there are many executed VMs 162 on the hypervisor 160. Thus, to optimize the resource of the virtual machine server 162 and to provide efficient user login, the virtual machine server 120 may provide a total number of (M+S) instances of spare VMs such that the spare VMs may be ready for the users to login, where M is a predetermined minimum number, and S is a predetermined spare number. In particular, if there are many VMs 162 being currently executed and the number of executed VMs 162 is greater than M, the virtual machine server 162 may execute certain instances of the VMs 162 to maintain at least the spare number S of the spare VMs. On the other hand, if there is only a small number of the executed VMs 162 running on the hypervisor 160, and the small number is not greater than M, it may not be necessary for the virtual machine server 162 to provide additional spare VMs since the (M+S) instances of spare VMs is not used up. In this case, there will always be at least (M+S) instances of VMs running in the system 100.

In certain embodiments, based on the concept of providing spare VMs, the computer executable code 138 may control virtual machine server 120 to prepare a plurality of spare VMs on the executed hypervisor 160 according to the following procedures. First, the computer executable code 138 may set a plurality of predetermined numbers M and S. The predetermined minimum number M refers to a minimum number of the executed VMs 162, which is an integer between 0 and the total number N of the VMs 162. The predetermined spare number S refers to a number of the spare VMs to be maintained, which is a positive integer between 1 and N. In operation, at the start of the virtual machine server 120, the computer executable code 138 may control virtual machine server 120 to prepare (M+S) instances of the VMs as the spare VMs. The values of the predetermined numbers M and S may be configurable. The purpose of providing the spare VMs is to provide pre-emptive startup of the VMs 162 for anticipated demand by the users. Whenever a user attempts to login from one of the computing devices 110, one of the spare VMs may be assigned to the user. The spare VM assigned to the user then becomes an "executed" VM, which refers to a VM instance assigned to the user, while the spare VMs not assigned to the users are not considered as executed VMs. In this case, when a current number X of the executed VMs is detected, the computer executable code 138 may compare X to M. If X>M, the computer executable code 138 controls the virtual machine server 120 to execute some VMs as the spare VMs, such that S instances of VMs will be available. If X<=M, there will be at least some of the (M+S) instances of the spare VMs available, and the computer executable code 138 does not have to control the virtual machine server 120 to execute additional VMs as the spare VMs, thus the resource of the virtual machine server 120 may be saved.

Figure 3:
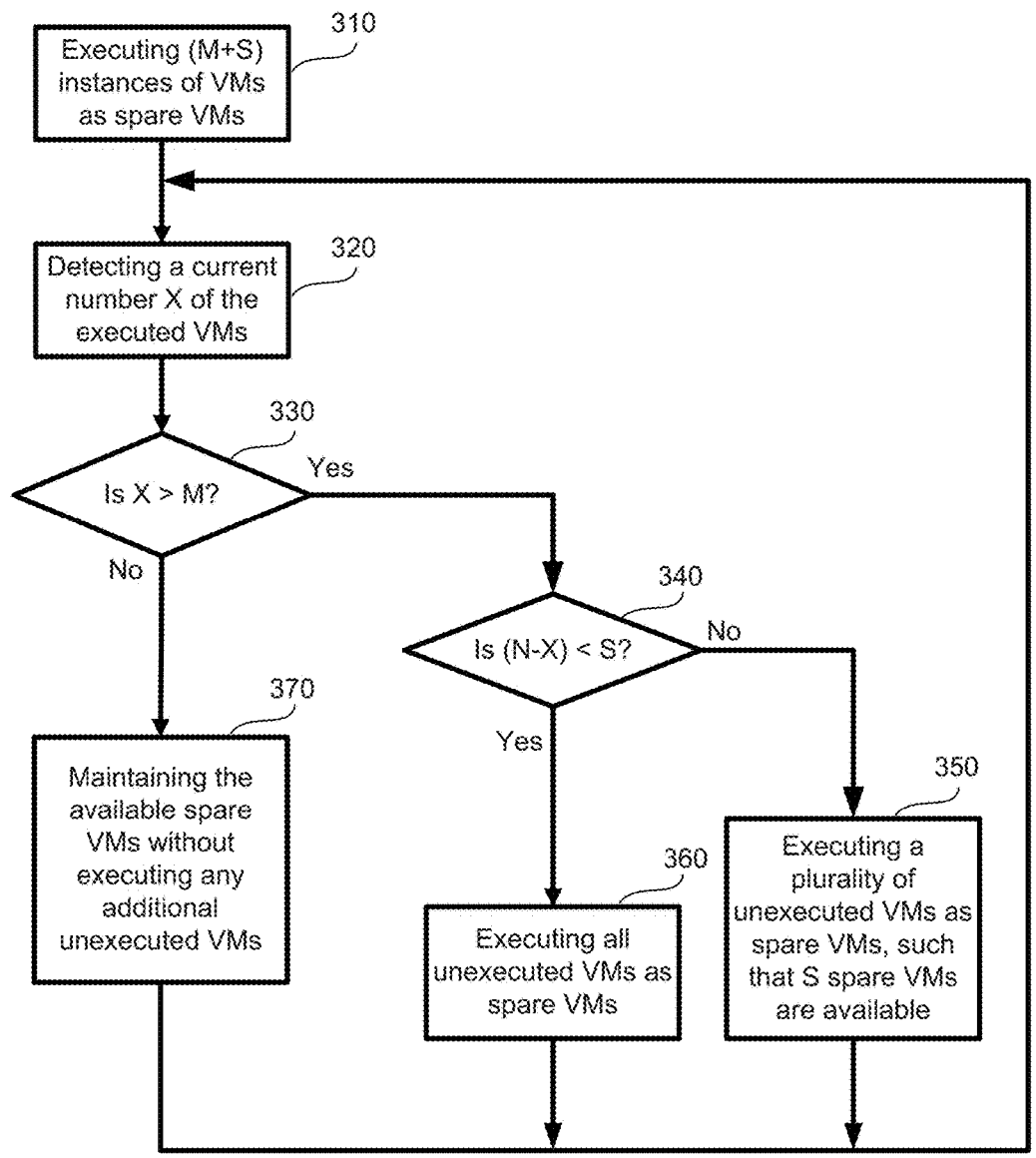
FIG. 3 depicts a flowchart showing VM management of the system according to certain embodiments of the present disclosure.

A further aspect of the present disclosure is directed to a method for performing VM management to provide efficient user login and minimize resource usage. FIG. 3 depicts a flowchart showing VM management of the system according to certain embodiments of the present disclosure. In certain embodiments, the VM management procedures as shown in FIG. 3 may be implemented by the virtual machine server 120 and the virtual desktop controller 130 of the system 100 as shown in FIG. 1.

At procedure 310, the virtual desktop controller 130 of the system 100 may control the virtual machine server 120 to execute (M+S) instances of VMs 162 as the spare VMs. In certain embodiments, the numbers M and S may be predetermined by the administrator of the system 100. For example, when the virtual machine server 120 has a total number of 50 VMs 162, the predetermined minimum number M may be set as 20, and the predetermined number S may be set as 5. In this case, the virtual desktop controller 130 of the system 100 may control the virtual machine server 120 to execute 25 instances of VMs 162 as the spare VMs. In other words, 25 instances of spare VMs will be ready for the users to login.

At procedure 320, the virtual desktop controller 130 detects a current number X of the executed VMs 162 on the executed hypervisor 160 at the virtual machine server 120. In certain embodiments, the virtual desktop controller 130 may detect the current number X of the executed VMs 162 periodically. For example, the virtual desktop controller 130 may detect the current number X of the executed VMs 162 once per minute.

Once the current number X of the executed VMs 162 is detected, at procedure 330, the virtual desktop controller 130 compares X and the predetermined minimum number M to determine whether X is greater than M or not. If X>M, the virtual desktop controller 130 moves to procedure 340. If X<=M, the virtual desktop controller 130 moves to procedure 370. For example, if the predetermined minimum number M is set as 20, and more than 20 instances of the executed VMs 162 are detected, the virtual desktop controller 130 moves to procedure 340. If the predetermined minimum number M is set as 20, and 20 or fewer instances of the executed VMs 162 are detected, the virtual desktop controller 130 moves to procedure 370.

It should be noted that, in certain embodiments, the predetermined minimum number M may be set as zero. In this case, the current number X will always be greater than M whenever at least one user has login to the system 100 such that X is not zero.

At procedure 340, since X>M, additional spare VMs may be required to provide efficient user login. In this case, the virtual desktop controller 130 may compare the predetermined number S to the number (N−X) of unexecuted VMs 162. If (N−X)<S, the virtual desktop controller 130 moves to procedure 350. If (N−X)>=S, the virtual desktop controller 130 moves to procedure 360. For example, assuming that the virtual machine server 120 has a total number of 50 VMs 162, and the predetermined number S is set as 5. In this case, if more than 45 instances of the executed VMs 162 are detected, (N−X) would be smaller than S, and the virtual desktop controller 130 moves to procedure 350. If 45 or fewer instances of the executed VMs 162 are detected, (N−X) would be greater than or equal to S, and the virtual desktop controller 130 moves to procedure 360.

At procedure 350, since (N−X)<S, there will be enough unexecuted VMs 162 available to be executed as the spare VMs. Thus, the virtual desktop controller 130 may control the virtual machine server 120 to execute a plurality of unexecuted VMs as the spare VMs, such that S instances of the spare VMs are available. Then virtual desktop controller 130 may move back to procedure 320 to further detect the current number X of the executed VMs 162.

At procedure 360, since (N−X)>=S, the number of the unexecuted VMs 162 is not enough to provide S instances of spare VMs. Thus, the virtual desktop controller 130 may control the virtual machine server 120 to execute all unexecuted VMs as the spare VMs. It should be particularly noted that, if all N instances of VMs 162 are executed, there will be no spare VM available. Then virtual desktop controller 130 may move back to procedure 320 to further detect the current number X of the executed VMs 162.

At procedure 370, since X<=M, not all of the (M+S) instances of the spare VMs have been assigned to become the executed VMs. In this case, there is no need for the virtual machine server 120 to execute additional instances of spare VMs. In order to save the resources of the virtual machine server 120, the virtual desktop controller 130 may do nothing to maintain the available instances of the spare VMs without executing any additional unexecuted VMs. Then the virtual desktop controller 130 may move back to procedure 320 to further detect the current number X of the executed VMs 162.

As described above, the values of the predetermined numbers M and S may be configurable. Generally, the administrator of the system 100 may determine the values of M and S based on the size of the system 100 (e.g., the total number N of the VMs 162), the performance and resource of the system 100, and other factors such as the user login patterns. In certain embodiments, the administrator of the system 100 may manually control the virtual desktop controller 130 to change the value of the predetermined numbers M and S based on the operation of the system 100 at any time. For example, when the virtual machine server 120 has a total number of 50 VMs 162, the predetermined minimum number M may be set as 20, and the predetermined number S may be set as 5. In this case, if the administrator monitors the performance and/or available resource of the system 100 and determines that M=20 is too large and S=5 is too small, the administrator may manually control the virtual desktop controller 130 to adjust the values of M and S, e.g. setting the value of M to 10, and the value of S to 10. In this case, the virtual desktop controller 130 of the system 100 may control the virtual machine server 120 to maintain at least 10 instances of spare VMs whenever the current number X is greater than 10.

In certain embodiments, optionally, the administrator may manually control the virtual machine server 120 to execute additional instances of spare VMs, or to shut down any unused spare VMs, without changing the value of the predetermined numbers M and S.

In certain embodiments, when a computing device 110 is not remotely accessing any of the executed VMs 162 at the virtual machine server 120, and the virtual machine server 120 receives an instruction from the computing device 110 to access one of the VMs 162, the virtual machine server 120 may assign one of the spare VMs to the computing device 110 in response to the instruction, such that a user at the computing device 110 may remotely access the assigned VM. In this case, the assigned VM becomes an executed VM. It should be noted that when X>M, the virtual desktop controller 130 may control the virtual machine server 120 to execute a plurality of unexecuted VMs as the spare VMs, such that S instances of the spare VMs are available. On the other hand, when X<=M, there will be some instances of the spare VMs available. Thus, there will always be some spare VMs available such that the virtual machine server 120 may assign one of the spare VMs to the computing device 110 in response to the instruction.

Figure 4A:
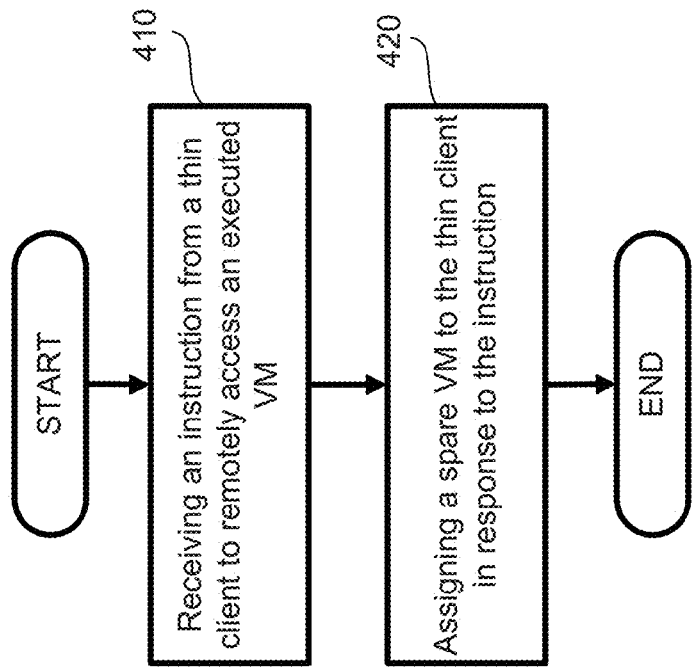
FIG. 4A depicts a flowchart showing VM remote access from a thin client computing device according to certain embodiments of the present disclosure.

FIG. 4A depicts a flowchart showing VM remote access from a thin client computing device according to certain embodiments of the present disclosure. In certain embodiments, the VM remote access procedures as shown in FIG. 4A may be performed by one of the computing devices 110 and the virtual machine server 120 of the system 100 as shown in FIG. 1, and the computing device 110 is not remotely accessing any of the executed VMs 162 at the virtual machine server 120.

At procedure 410, the virtual machine server 120 receives an instruction from a thin client computing device 110 to remotely access an executed VM 162. In certain embodiments, the VM 162 may be a pooled VM.

At procedure 420, since there will always be spare VMs available, the virtual machine server 120 assigns a spare VM to the thin client computing device 110 in response to the instruction, such that the thin client computing device 110 may remotely access the assigned VM 162.

In certain embodiments, when a computing device 110 is remotely accessing a corresponding executed VMs 162 at the virtual machine server 120, and the virtual machine server 120 receives an instruction from the computing device 110 to shut down the corresponding executed VM, the virtual machine server 120 may shut down the corresponding executed VM 162 in response to the instruction.

Figure 4B:
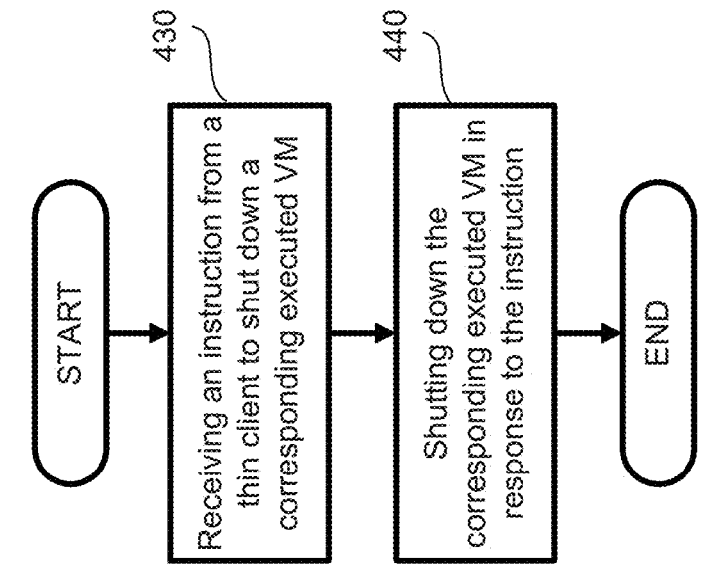
FIG. 4B depicts a flowchart showing VM remote shutdown from a thin client computing device according to certain embodiments of the present disclosure.

FIG. 4B depicts a flowchart showing VM remote shutdown from a thin client computing device according to certain embodiments of the present disclosure. In certain embodiments, the VM remote shutdown procedures as shown in FIG. 4B may be performed by one of the computing devices 110 and the virtual machine server 120 of the system 100 as shown in FIG. 1, and the computing device 110 is remotely accessing a corresponding executed VMs 162 at the virtual machine server 120.

At procedure 430, the virtual machine server 120 receives an instruction from a thin client computing device 110 to shut down the corresponding executed VM 162. In certain embodiments, the VM 162 may be a shared instance of a pooled VM.

At procedure 440, in response to the instruction, the virtual machine server 120 shuts down the corresponding executed VM.

It should be noted that the virtual machine server 120 may receive different instructions from different thin client computing devices 110 within a certain period of time. For example, the virtual machine server 120 may receive a first instruction from a first computing device 110 to remotely access an executed VM. At the same time, the virtual machine server 120 may receive a second instruction from a second computing device 110 to shut down a corresponding executed VM. In this case, the virtual machine server 120 may independently perform the remote access procedures as shown in FIG. 4A for the first computing device 110, and perform the remote shutdown procedures as shown in FIG. 4B for the second computing device 110 simultaneously.

In a further aspect, the present disclosure is related to a non-transitory computer readable medium storing computer executable code. The code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 126 of the virtual desktop controller 120 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a virtual machine server storing a hypervisor and a plurality of virtual machines (VMs) {VM-1, VM-2, . . . , VM-N}, wherein N is a positive integer greater than one;
a plurality of computing devices communicatively connected to the virtual machine server via a network, wherein each of the computing devices is configured to remotely access one of the executed VMs; and
a virtual desktop controller communicatively connected to the virtual machine server via an interface, wherein the virtual desktop controller comprises a processor, a memory, and a storage device storing computer executable code, wherein the computer executable code, when executed at the processor, is configured to:
control the virtual machine server to execute the hypervisor, and to execute at least (M+S) instances of the VMs as spare VMs on the executed hypervisor, wherein M and S are integers, $0 \leq M < N$, and $0 < S < N$;
detect a current number X of the executed VMs assigned to the computing devices on the executed hypervisor, wherein X is an integer, and $0 < X \leq N$;
determine whether the current number X is greater than M; and
in response to determining that X is greater than M, control the virtual machine server to execute a plurality of unexecuted VMs as the spare VMs on the executed hypervisor, such that at least S instances of the spare VMs are available, wherein the virtual machine server is configured to:
receive a first instruction from a first computing device of the computing devices to access one of the VMs, wherein the first computing device is not remotely accessing any of the executed VMs;
assign one of the spare VMs to the first computing device in response to the first instruction;
receive a second instruction from a second computing device of the computing devices to shut down a corresponding executed VM assigned to the second computing device, wherein the second computing device is remotely accessing the corresponding executed VM; and
shut down the corresponding executed VM in response to the second instruction.

2. The system as claimed in claim 1, wherein the computer executable code, when executed at the processor, is further configured to:
when S is greater than (N−X), control the virtual machine server to execute all of the unexecuted VMs as the spare VMs on the hypervisor.

3. The system as claimed in claim 1, wherein the virtual machine server is further configured to:
execute the hypervisor; and
execute the VMs on the executed hypervisor,
wherein each of the executed VMs is configured to be accessible for the computing devices functioning as a plurality of thin clients.

4. The system as claimed in claim 1, wherein the computer executable code is configured to detect the current number X of the executed VMs assigned to the computing devices periodically.

5. The system as claimed in claim 1, wherein each of the VMs is a shared instance of a pooled VM.

6. A method for performing virtual machine (VM) management to provide efficient user login and minimize resource usage, the method comprising:
controlling, by a processor of a virtual desktop controller, a virtual machine server to execute a hypervisor, and to execute at least (M+S) instances of a plurality of VMs {VM-1, VM-2, . . . , VM-N} as spare VMs on the executed hypervisor, wherein the virtual desktop controller is communicatively connected to the virtual machine server via an interface, N is a positive integer greater than one, and M and S are integers, wherein 0≤M<N, and 0<S<N;
detecting, by the processor of the virtual desktop controller, a current number X of the executed VMs assigned to a plurality of computing devices on the executed hypervisor, wherein the computing devices are communicatively connected to the virtual machine server via a network, wherein each of the computing devices is configured to remotely access one of the executed VMs, X is an integer, and 0<X≤N;
determining, by the processor of the virtual desktop controller, whether the current number X is greater than M; and
in response to determining that X is greater than M, controlling, by the processor of the virtual desktop controller, the virtual machine server to execute a plurality of unexecuted VMs as the spare VMs on the executed hypervisor, such that at least S instances of the spare VMs are available;
wherein the virtual machine server is configured to:
receive a first instruction from a first computing device of the computing devices to access one of the VMs, wherein the first computing device is not remotely accessing any of the executed VMs; and
assign one of the spare VMs to the first computing device in response to the first instruction;
receive a second instruction from a second computing device of the computing devices to shut down a corresponding executed VM assigned to the second computing device, wherein the second computing device is remotely accessing the corresponding executed VM; and
shut down the corresponding executed VM in response to the second instruction.

7. The method as claimed in claim 6, further comprising: when S is greater than (N−X), controlling, by the processor of the virtual desktop controller, the virtual machine server to execute all of the unexecuted VMs as the spare VMs on the hypervisor.

8. The method as claimed in claim 6, wherein each of the VMs is a shared instance of a pooled VM.

9. The method as claimed in claim 6, wherein the virtual machine server is further configured to:
execute the hypervisor; and
execute the VMs on the executed hypervisor,
wherein each of the executed VMs is configured to be accessible for the computing devices functioning as a plurality of thin clients.

10. A non-transitory computer readable medium storing computer executable code, wherein the code, when executed at a processor of a virtual desktop controller, is configured to:
control a virtual machine server to execute a hypervisor, and to execute at least (M+S) instances of a plurality of VMs {VM-1, VM-2, . . . , VM-N} as spare VMs on the executed hypervisor, wherein the virtual desktop controller is communicatively connected to the virtual machine server via an interface, N is a positive integer greater than one, and M and S are integers, wherein 0≤M<N, and 0<S<N;
detect a current number X of the executed VMs assigned to a plurality of computing devices on the executed hypervisor, wherein the computing devices are communicatively connected to the virtual machine server via a network, wherein each of the computing devices is configured to remotely access one of the executed VMs, X is an integer, and 0<X≤N;
determine whether the current number X is greater than M; and
in response to determining that X is greater than M, control the virtual machine server to execute a plurality of unexecuted VMs as the spare VMs on the executed hypervisor, such that at least S instances of the spare VMs are available;
wherein the virtual machine server is configured to:
receive a first instruction from a first computing device of the computing devices to access one of the VMs, wherein the first computing device is not remotely accessing any of the executed VMs;
assign one of the spare VMs to the first computing device in response to the first instruction;
receive a second instruction from a second computing device of the computing devices to shut down a corresponding executed VM assigned to the second computing device, wherein the second computing device is remotely accessing the corresponding executed VM; and
shut down the corresponding executed VM in response to the second instruction.

11. The non-transitory computer readable medium as claimed in claim 10, wherein the computer executable code, when executed at the processor, is further configured to:
when S is greater than (N−X), control the virtual machine server to execute all of the unexecuted VMs as the spare VMs on the hypervisor.

12. The non-transitory computer readable medium as claimed in claim 10, wherein each of the VMs is a shared instance of a pooled VM.

13. The non-transitory computer readable medium as claimed in claim 10, wherein the virtual machine server is further configured to:
execute the hypervisor; and
execute the VMs on the executed hypervisor,
wherein each of the executed VMs is configured to be accessible for the computing devices functioning as a plurality of thin clients.

14. The non-transitory computer readable medium as claimed in claim 10, wherein the computer executable code is configured to detect the current number X of the executed VMs assigned to the computing devices periodically.

\* \* \* \* \*